(12) United States Patent
Liu et al.

(10) Patent No.: US 10,110,604 B2
(45) Date of Patent: *Oct. 23, 2018

(54) SANDBOX TECHNOLOGY BASED WEBPAGE BROWSING METHOD AND DEVICE

(71) Applicant: BEIJING QIHOO TECHNOLOGY COMPANY LIMITED, Xicheng, Beijing (CN)

(72) Inventors: Weigang Liu, Beijing (CN); Peng Sun, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,311

(22) Filed: Jun. 28, 2017

(65) Prior Publication Data

US 2017/0302672 A1    Oct. 19, 2017

Related U.S. Application Data

(63) Continuation of application No. 14/368,402, filed as application No. PCT/CN2012/087266 on Dec. 24, 2012, now Pat. No. 9,699,189.

(30) Foreign Application Priority Data

Dec. 28, 2011    (CN) .......................... 2011 1 0448815

(51) Int. Cl.
*H04L 29/06*    (2006.01)
*G06F 21/53*    (2013.01)

(52) U.S. Cl.
CPC .............. *H04L 63/10* (2013.01); *G06F 21/53* (2013.01); *H04L 63/14* (2013.01); *G06F 2221/033* (2013.01)

(58) Field of Classification Search
CPC ......... H04L 63/08; H04L 63/10; H04L 63/14; G06F 21/51; G06F 21/53
See application file for complete search history.

(56) References Cited

U.S. PATENT DOCUMENTS 8,127,033 B1 *   2/2012   Newstadt ..........  G06F 17/30893
                                                          709/203
8,290,763 B1 *  10/2012   Zhang .....................  G06F 9/455
                                                          703/26

(Continued)

OTHER PUBLICATIONS

International Search Report regarding PCT/CN2012/087266 dated Apr. 4, 2013, 4 pages.

(Continued)

*Primary Examiner* — Matthew Smithers
*Assistant Examiner* — Shaqueal D Wade
(74) *Attorney, Agent, or Firm* — Polsinelli PC (57) ABSTRACT

The disclosure includes a sandbox technology based webpage browsing method and device. A method comprises receiving an instruction for webpage browsing in a sandbox. Upon receiving the instruction, a framework process is started outside the sandbox to process an operation incurred in the framework process outside the sandbox, wherein the framework process is a first part implemented by a browser. A browser process created by the framework process is intercepted, wherein the browser process is a second part implemented by the browser. The browser process is put into the sandbox to save a webpage access result in a specified directory in the sandbox or to run a script in the webpage in a virtual environment of the sandbox.

15 Claims, 3 Drawing Sheets

(56) References Cited

U.S. PATENT DOCUMENTS 8,856,874 B2 * 10/2014 Pieczul .................. G06F 21/53
726/3
2011/0022643 A1 1/2011 Julien et al.

OTHER PUBLICATIONS

English translation of website: http://sqliu.sinaapp.com/?p-21, Publication date Dec. 20, 2011, Country: China, Author: Show Qun, Title: Sandbox mechanism and implementation in the Chromium browser, one page.
English translation of Abstract only for application CN102184356A, Publication date: Sep. 14, 2011, Country: China, Inventors: Jihuang Fan et al, Title: Method, device and safety browser by utilizing sandbox technology to defend, one page.
English translation of Abstract only for application CN101960446A, Publication date: Jan. 26, 2011, Country: China, Inventors: Lloyd T Hilaiel et al, Title: Secure browser-based applications, one page.

* cited by examiner

SANDBOX TECHNOLOGY BASED WEBPAGE BROWSING METHOD AND DEVICE

RELATED APPLICATIONS

This application is a continuation of U.S. application Ser. No. 14/368,402, filed Jun. 24, 2014, which is a National Stage of International Application No. PCT/CN2012/087266, filed Dec. 24, 2012, which claims the benefit of Chinese Patent Application No. 201110448815.2, filed Dec. 28, 2011, the disclosures of which are incorporated herein by reference in their entireties.

FEDERALLY SPONSORED RESEARCH OR DEVELOPMENT

Not Applicable.

COMPACT DISK APPENDIX

Not Applicable.

FIELD OF THE INVENTION

The invention relates to the field of browser security technology, and in particular, to a sandbox technology based webpage browsing method and device.

BACKGROUND OF THE INVENTION

As the network security issues have become increasingly prominent, the sandbox technology is more applied in secure webpage access. From a technical implementation point of view, the so called sandbox technology is to change from originally preventing a suspicious program from access to a system into redirecting access of a suspicious program to a disk, a registry, etc. to a specified file folder, thereby eliminating damage to the system. For a browser, the sandbox system constructs a secure virtual execution environment. Any write disk operation by the browser will be redirected to a specific temporary file folder. Thus, even if a webpage contains a malicious program such as a virus, a Trojan, an advertisement, etc., and even if it is forcibly installed, it is only installed in the temporary file folder, and will not cause harm to the user's actual system.

The use of such a technology improves the security of a user's system, but at the same time also brings about some limitations. For example, the user may sometimes need to actually download a file on the internet by way of a browser, at this point, the file can only be downloaded to a virtual directory due to limitations of the sandbox, and after the browser program exits, the sandbox will delete these temporary files, causing that a file cannot be saved permanently. Or, sometimes the user needs to adjust some settings of the browser, a modification of these settings will result in a modification of the registry information, and at this point, these modifications will not be successfully saved due to the limitations of the sandbox. Clearly, only if a necessary adjustment must be made to the use of the prior sandbox technology, can the requirements of the browser be met.

SUMMARY OF THE INVENTION

In view of the above problems, the invention is proposed to provide a sandbox technology based webpage browsing device and a corresponding sandbox technology based webpage browsing method which overcome the above problems or at least in part solve or mitigate the above problems.

According to an aspect of the invention, there is provided a sandbox technology based webpage browsing method comprising:

upon receiving an instruction for webpage browsing in a sandbox, starting a framework process outside the sandbox, so that an operation incurred in the framework process is processed outside the sandbox;

intercepting a browser process created by the framework process and putting the browser process into the sandbox, so that a webpage access result is saved in a specified directory in the sandbox, and/or a script in the webpage runs in a virtual environment of the sandbox.

According to another aspect of the invention, there is provided a sandbox technology based webpage browsing device comprising:

a framework process starting unit, configured to, upon receiving an instruction for webpage browsing in a sandbox, start a framework process outside the sandbox, so that an operation incurred in the framework process is processed outside the sandbox;

a browser process processing unit, configured to intercept a browser process created by the framework process and put the browser process into the sandbox, so that a webpage access result is saved in a specified directory in the sandbox, and/or a script in the webpage runs in a virtual environment of the sandbox.

Therein, the operation incurred in the framework process comprises a user input operation.

According to yet another aspect of the invention, there is provided a computer program comprising a computer readable code which causes a server to perform the sandbox technology based webpage browsing method according to any of claims 1-5, when said computer readable code is running on the server.

According to still another aspect of the invention, there is provided a computer readable medium storing the computer program as claimed in claim 11 therein.

According to still another aspect, a sandbox technology based webpage browsing method comprises receiving an instruction for webpage browsing in a sandbox. Upon receiving the instruction, the method includes starting a framework process outside the sandbox to process an operation incurred in the framework process outside the sandbox, wherein the framework process is a first part implemented by a browser. A browser process created by the framework process is intercepted, wherein the browser process is a second part implemented by the browser. The browser process is put into the sandbox to save a webpage access result in a specified directory in the sandbox or to run a script in the webpage in a virtual environment of the sandbox.

According to still another aspect, a sandbox technology based webpage browsing device comprises a memory having instructions stored thereon and a processor to execute the instructions to perform operations for webpage browsing. The operations comprise receiving an instruction for webpage browsing in a sandbox. The operations include upon receiving the instruction, starting a framework process outside the sandbox to process an operation incurred in the framework process outside the sandbox, wherein the framework process is a first part implemented by a browser. A browser process created by the framework process is intercepted, wherein the browser process is a second part implemented by the browser. The browser process is put into the sandbox to save a webpage access result in a specified directory in the sandbox or to run a script in the webpage in a virtual environment of the sandbox.

According to still another aspect, a non-transitory computer readable medium has instructions stored thereon that, when executed by a computing device cause the computing device to perform sandbox technology based webpage browsing operations. The operations comprise receiving an instruction for webpage browsing in a sandbox. The operations further comprise upon receiving the instruction, starting a framework process outside the sandbox to process an operation incurred in the framework process outside the sandbox, wherein the framework process is a first part implemented by a browser. A browser process created by the framework process is intercepted, wherein the browser process is a second part implemented by the browser. The browser process is put into the sandbox to save a webpage access result in a specified directory in the sandbox, or to run a script in the webpage in a virtual environment of the sandbox.

The beneficial effects of the invention lie in that:

By way of the invention, a way is employed in which a part of processes of a browser runs in a sandbox, namely, a browser process runs in the sandbox, and a framework process runs outside the sandbox, and in this way, since the framework process providing a user operation part runs outside the sandbox and is not limited by the drawbacks of the sandbox, an operation result of the user may be saved locally. Meanwhile, the browser process runs in the sandbox, a webpage access result is saved in a temporary directory of the sandbox, and a malicious program in a webpage runs in a virtual environment of the sandbox and therefore will not damage the actual system of the user, thereby guaranteeing the security of the browser. As such, not only the convenience of user operations is ensured, but also the security requirement for webpage access is met.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

Figure 1:
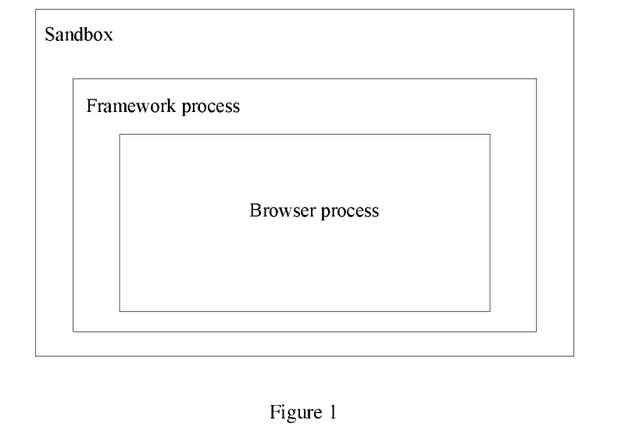
FIG. 1 is a schematic diagram of an implementation in the prior art.

To facilitate understanding, the usage of a sandbox in the prior art in a browser will first briefly introduced. As is well known, nowadays the implementation of some browsers is divided into two parts, a frame process and a browser process, wherein the frame process is responsible for a UI (User Interface) operation interface such as a user input and a webpage access action, etc., and the browser process (in a multi-tab browser, a browser process is equivalent to a tab process, multiple tabs may correspond to one browser process, and as the tabs being opened increase, the number of the browser processes also might increase) is responsible for showing an access result of a user; and the framework process controls the behaviors of the browser process through IPC (Inter-Process Communication). The prior art browser uses an implementation of the sandbox function, and as long as it is required to browser a webpage in the sandbox, both the framework process and the browser process are all put into the sandbox, as shown in FIG. 1.

However, the inventors have found in the course of realizing the invention that, it is because both the framework process and the browser process of a browser run in a sandbox that various limitations of the sandbox all act on the browser, all the modifications generated by the browser when the user operating the sandbox are temporary, for example, an operation such as downloading a file, modifying a setting, updating the favorites, etc., and when the browser exits, all the modifications will be lost completely. The inconvenience brought about by such a limitation is significantly greater than the security provided by the sandbox, and these inconveniences in turn limit the use of the sandbox technology in a browser. Therefore, in order for a browser to be used conveniently in a sandbox, the above drawbacks of using functions of the sandbox by the browser must be overcome.

Based on what is described above, an embodiment of the invention provides a sandbox technology based webpage browsing method. See FIG. 2, the method comprises the following steps.

Figure 2:
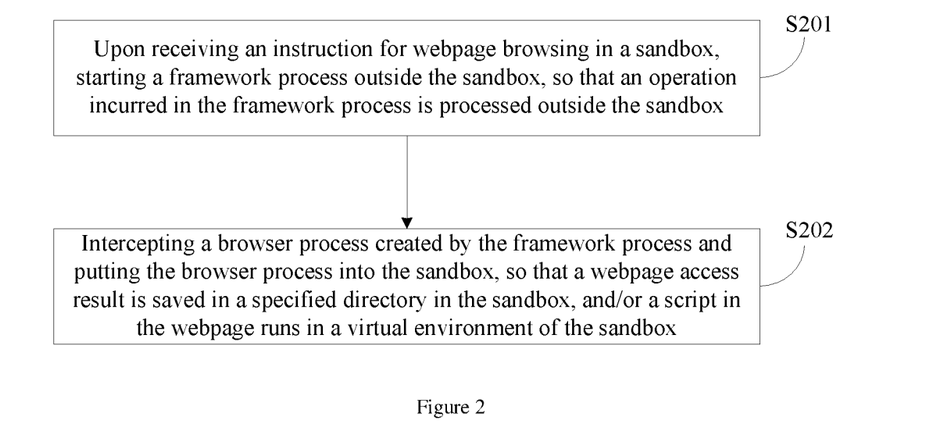
FIG. 2 schematically shows a flow chart of a method according to an embodiment of the invention.

In S201, upon receiving an instruction for webpage browsing in a sandbox, a framework process is started outside the sandbox, so that an operation incurred in the framework process is processed outside the sandbox.

When it comes to a particular implementation, it may be that by default, as long as a browser is started, webpage browsing is needed to be done in the sandbox, and at this point, as long as an instruction for starting a browser is received, it amounts to receiving an instruction for webpage browsing in a sandbox. Or, in another way, it may also be possible not to automatically enter the sandbox, but to click a specified button in the browser (of course, it may also be other way of entering) when a user thinks it necessary, so as to issue an instruction for webpage browsing in a sandbox, and so on. An embodiment of the invention may use and not be limited to any one of the above ways. After the instruction for webpage browsing in a sandbox is received, a framework process may be started outside the sandbox.

In S202, intercepting a browser process created by the framework process and putting the browser process into the sandbox, so that a webpage access result is saved in a specified directory in the sandbox, and/or a script in the webpage runs in a virtual environment of the sandbox.

Figure 3:
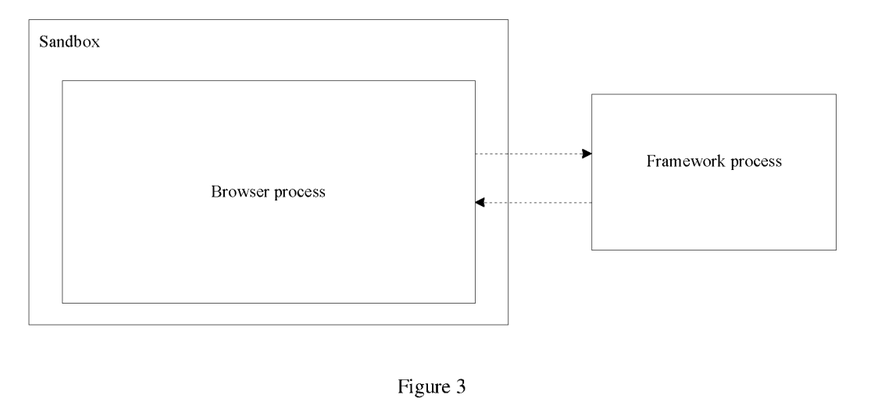
FIG. 3 schematically shows a schematic diagram of an implementation in an embodiment according to the invention.

After the framework process is created outside the sandbox, the framework process will start a browser process, and at this point, the created browser process may be intercepted and put into the sandbox, that is to say, the browser process is put into the sandbox, while the framework process is left outside the sandbox, as shown in FIG. 3. As such, since the framework process is responsible for an operation such as a user's input operation or an automatic update of the browser, etc., if it is left outside the sandbox, the process will not be limited by the sandbox, and thus when the user performs an operation such as download of a file locally, or addition of a webpage to the favorites, and the like, or when the browser automatically starts an update program to perform an update, the corresponding processing will be done outside the sandbox, and thereby a processing result will be saved in a local system. In the meantime, since the browser process is responsible for showing a webpage access result, the specific operation behaviors of a webpage are limited inside the sandbox, namely, the webpage access result will be saved in a specified directory in the sandbox, and a script in the webpage runs in a virtual environment of the sandbox, which will not affect the local system of the user.

It needs to be noted that, while in the embodiments of the invention, the framework window is left outside the sandbox and a part of the processing results will be directly saved in the local system of the user, normally, this will not reduce the security in the course of webpage browsing. It is because a common malicious attack is generally conducted by a script running in a webpage, for example, after a certain webpage is opened, a file may be forced to be downloaded, or a plug-in may be installed, or the like, if a malicious script is inserted into the webpage. However, it is the browser process that is responsible for such a script operation behavior in a webpage, and the browser process has been put into the sandbox, so even if a malicious script program is contained in the webpage, it will be confined in the virtual environment of the sandbox when running, and will not affect the local system. On the other hand, the framework process is only responsible for behaviors related with a user input, the results produced are thereby generally actively caused by the user, and these behaviors are actively initiated by the user and do not have a malicious offensiveness, so the corresponding results saved locally will also not bring about a security threat to the local system.

Evidently, in the embodiments of the invention, a way is employed in which a part of processes of a browser runs in a sandbox, namely, a browser process runs in the sandbox, and a framework process runs outside the sandbox, and in this way, since the framework process providing a user operation, an automatic update, etc. runs outside the sandbox and is not limited by the drawbacks of the sandbox, an operation result of the user or a result of an automatic update, etc. may be saved locally. Meanwhile, the browser process runs in the sandbox, a webpage access result is saved in a temporary directory of the sandbox, and a malicious program in a webpage runs in a virtual environment of the sandbox and therefore will not damage the actual system of the user, thereby guaranteeing the security of the browser. As such, not only the convenience of user operations is ensured, but also the security requirement for webpage access is met.

In addition, it needs to be noted that, if it is a way in which the user performs browsing within a sandbox when considered necessary, after the user selects to perform browsing within the sandbox, a framework window will be recreated, namely, from the user's perspective, it amounts to starting two framework windows, the original framework window and a browser window it already created run outside the sandbox, a newly started framework process runs outside the sandbox, and a browser process created by the newly started framework process runs in the sandbox.

In a practical application, the above functions may be accomplished by coordination of a browser with an application having the functions of a sandbox, that is, after the browser newly starts a framework process, when the framework process creates a browser process, the browser process is intercepted and put into the sandbox to run by the application having the functions of a sandbox. In such an implementation, in order for the browser process to be able to enter the sandbox, also extra information will be needed to be provided for a sandbox driver to identify. When it comes to a particular implementation, a preset identification may be added to a browser process when the framework process creates the browser process, and in this way, after the application having the functions of a sandbox intercepts the browser process, the browser process may be put into the sandbox by the sandbox driver if the identification is found. Therein, the preset identification may be a sandboxie command line parameter, and of course, it may also be other pre-agreed implementation.

Additionally, in the course of webpage browsing, although a browser is divided into two parts, a framework process and a browser process, in some cases, it is necessary to perform some message interactions between the framework process and the browser process (i.e., inter-process communication) to realize normal webpage browsing. However, in the embodiments of the invention, the browser process is in the sandbox, whereas the framework process is outside the sandbox. At this point, if the browser process in the sandbox needs to conduct inter-process communications with the framework process outside the sandbox, an operation instruction of the browser process outward from the sandbox will be shielded by the virtual environment of the sandbox due to the security restrictions of the sandbox. Therefore, it is necessary for the sandbox to do a special treatment to release instructions essential for the browser outside the sandbox to inform the external framework process, and meanwhile, the external framework process also needs to inform the browser process in the sandbox of some instructions of user operations (e.g., the user clicks a certain link, or clicks a "next page" button, etc.) to perform corresponding processing work.

To this end, an essential set of communication instructions of a browser may be predefined, and the sandbox passes the set of instructions sent outwards by the internal browser process, thereby guaranteeing a normal operation of the browser. In other words, in order to ensure that the browser can operate normally, the sandbox may allow some instructions to be sent outside the sandbox, but there are two premises: first, the instruction is sent to the framework process; second, the instruction belongs to the predefined set of communication instructions. Only if these two premises are met simultaneously, can the instruction be released to guarantee the security of the system.

In summary, in the embodiments of the invention, the browser process runs in the sandbox, thus, various modification results generated in the course of the browser accessing a webpage are saved in a temporary directory of the sandbox, malicious code in a webpage runs in a virtual environment provided by the sandbox, and thereby harm is isolated which is brought to the system of a user due to malicious website access; in the meantime, the framework process runs outside the sandbox and is not limited by the sandbox, the user may download a file on the internet to a local disk, modify the settings of the browser and save them in a local registry, and add the network favorites to the local disk, and so on, such operations are not limited by the sandbox.

Figure 4:
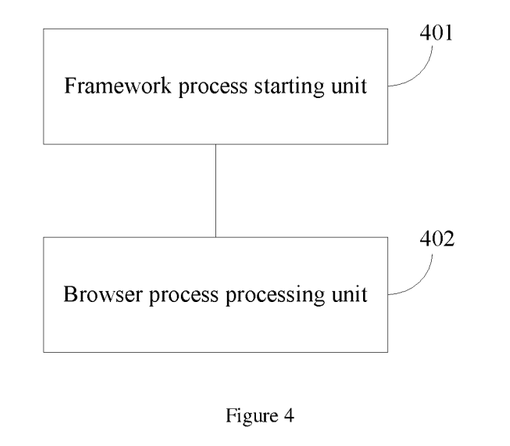
FIG. 4 schematically shows a schematic diagram of a device according to an embodiment of the invention.

Correspondingly to the sandbox technology based webpage browsing method provided by the embodiments of the invention, an embodiment of the invention further provides a sandbox technology based webpage browsing device, see FIG. 4, the device may comprise the following processing units:

a framework process starting unit 401 configured to, upon receiving an instruction for webpage browsing in a sandbox, start a framework process outside the sandbox, so that an operation incurred in the framework process is processed outside the sandbox;

a browser process processing unit 402, configured to intercept a browser process created by the framework process and put the browser process into the sandbox, so that a webpage access result is saved in a specified directory in the sandbox, and/or a script in the webpage runs in a virtual environment of the sandbox.

Therein, the operation incurred in the framework process comprises a user input operation.

In a practical application, the above functions may be accomplished by coordination of a browser with an application having the functions of a sandbox, and at this point, the device may further comprise:

an identification unit, configured to add an identification to a browser process when the framework process creates the browser process, such that a sandbox driver puts the browser process into the sandbox according to the identification.

When it comes to a particular implementation, the identification may include a sandboxie command line parameter, and of course, it may also be other implementation.

In order to guarantee a normal operation of the browser, some essential instructions may be allowed to be sent out from inside the sandbox. Of course, to guarantee the security, a set of instructions may be predefined, and only an instruction which belongs to the set of instructions can be released. At this point, the device may further comprise:

an instruction judgment unit, configured to, when the browser process in the sandbox needs to send out an instruction from the sandbox, judge whether the instruction is sent out to the framework process and belongs to a preset set of communication instructions; and an instruction releasing unit configured to release the instruction if the judgment result of the instruction judgment unit is yes.

In the sandbox technology based webpage browsing device provided by the embodiments of the invention, a way is employed in which a part of processes of a browser runs in a sandbox, namely, a browser process runs in the sandbox, and a framework process runs outside the sandbox, and in this way, since the framework process providing a user operation part runs outside the sandbox and is not limited by the drawbacks of the sandbox, an operation result of the user may be saved locally. Meanwhile, the browser process runs in the sandbox, a webpage access result is saved in a temporary directory of the sandbox, and a malicious program in a webpage runs in a virtual environment of the sandbox and therefore will not damage the actual system of the user, thereby guaranteeing the security of the browser. As such, not only the convenience of user operations is ensured, but also the security requirement for webpage access is met.

Embodiments of the individual components of the invention may be implemented in hardware, or in a software module running on one or more processors, or in a combination thereof. It will be appreciated by those skilled in the art that, in practice, some or all of the functions of some or all of the components in a sandbox technology based webpage browsing device according to individual embodiments of the invention may be realized using a microprocessor or a digital signal processor (DSP). The invention may also be implemented as an apparatus or a device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 5:
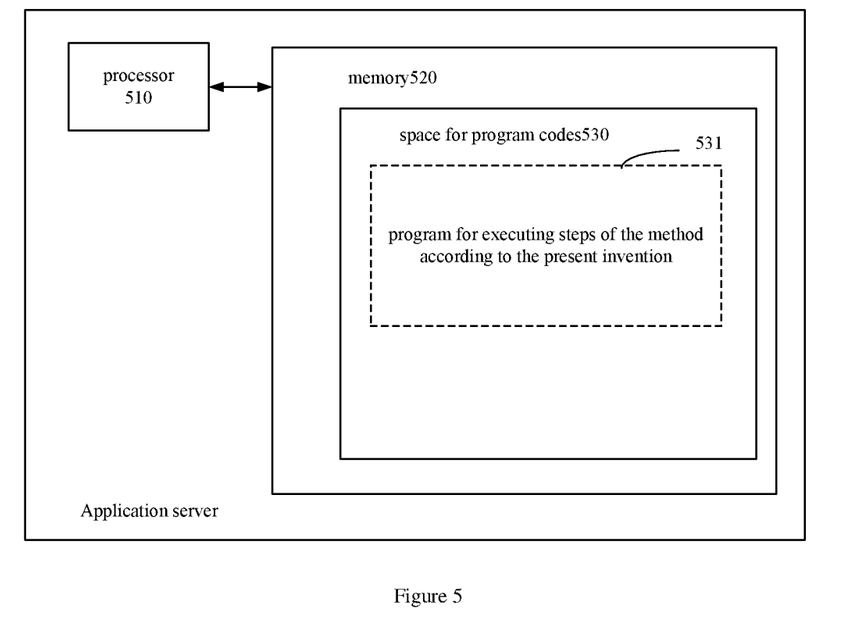
FIG. 5 shows schematically a block diagram of a server for carrying out a method according to the invention.
Figure 6:
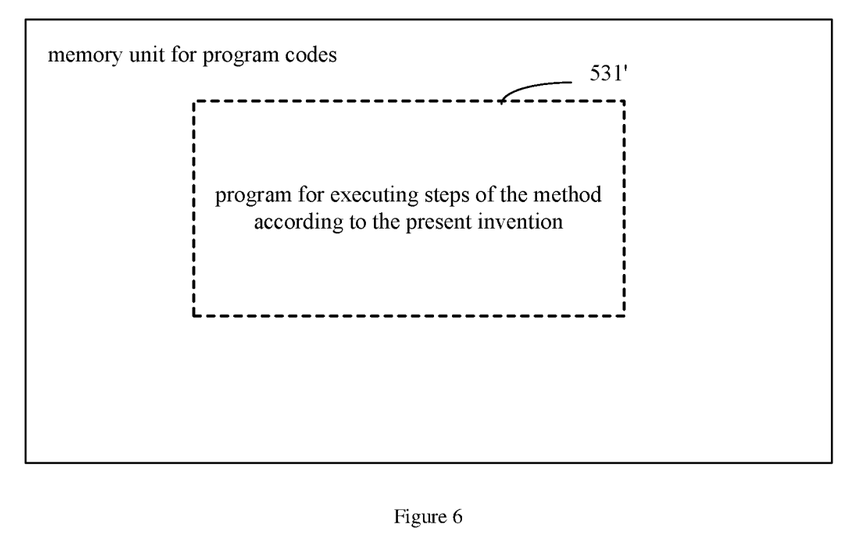
FIG. 6 shows schematically a storage unit for retaining or carrying a program code implementing a method according to the invention.

For example, FIG. 5 shows a server which may carry out a sandbox technology based webpage browsing method according to the invention, e.g., an application server. The server traditionally comprises a processor 510 and a computer program product or a computer readable medium in the form of a memory 520. The memory 520 may be an electronic memory such as a flash memory, an EEPROM (electrically erasable programmable read-only memory), an EPROM, a hard disk or a ROM. The memory 520 has a memory space 530 for a program code 531 for carrying out any method steps in the methods as described above. For example, the memory space 530 for a program code may comprise individual program codes 531 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 6. The storage unit may have a memory segment, a memory space, etc. arranged similarly to the memory 520 in the server of FIG. 5. The program code may for example be compressed in an appropriate form. In general, the storage unit comprises a computer readable code 531', i.e., a code which may be read by e.g., a processor such as 510, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A sandbox technology based webpage browsing method, comprising:
   receiving, by a processor, an instruction for webpage browsing in a sandbox;
   upon receiving the instruction, starting, by the processor, a framework process outside the sandbox to process an operation incurred in the framework process outside the sandbox, wherein the framework process is a first part implemented by a browser;
   intercepting, by the processor, a browser process created by the framework process, wherein the browser process is a second part implemented by the browser; and
   putting, by the processor, the browser process into the sandbox to save a webpage access result in a specified directory in the sandbox, or to run a script in the webpage in a virtual environment of the sandbox.

2. The method as claimed in claim 1, wherein the operation incurred in the framework process comprises a user input operation.

3. The method as claimed in claim 1, further comprising:
   adding an identification to the browser process when the framework process creates the browser process, and
   wherein putting the browser process into the sandbox further comprises putting the browser process into the sandbox according to the identification.

4. The method as claimed in claim 3, wherein the identification includes a sandboxie command line parameter.

5. The method as claimed in claim 1, further comprising:
   when the browser process in the sandbox needs to send out an instruction from the sandbox, determining whether the instruction is sent out to the framework process and belongs to a preset set of communication instructions; and
   releasing the instruction when the instruction is sent out to the framework process and the instruction belongs to the preset set of communication instructions.

6. A sandbox technology based webpage browsing device, comprising:
   a memory having instructions stored thereon; and
   a processor to execute the instructions to perform operations for webpage browsing, the operations comprising:
   receiving an instruction for webpage browsing in a sandbox;
   upon receiving the instruction, starting a framework process outside the sandbox to process an operation incurred in the framework process outside the sandbox, wherein the framework process is a first part implemented by a browser;
   intercepting a browser process created by the framework process, wherein the browser process is a second part implemented by the browser; and
   putting the browser process into the sandbox to save a webpage access result in a specified directory in the sandbox, or to run a script in the webpage in a virtual environment of the sandbox.

7. The device as claimed in claim 6, wherein the operation incurred in the framework process comprises a user input operation.

8. The device as claimed in claim 6, wherein the operations further comprise:
   adding an identification to the browser process when the framework process creates the browser process, and
   wherein putting the browser process into the sandbox further comprises putting the browser process into the sandbox according to the identification.

9. The device as claimed in claim 8, wherein the identification includes a sandboxie command line parameter.

10. The device as claimed in claim 6, wherein the operations further comprise:
    when the browser process in the sandbox needs to send out an instruction from the sandbox, determining whether the instruction is sent out to the framework process and belongs to a preset set of communication instructions; and
    releasing the instruction when the instruction is sent out to the framework process and belongs to the preset set of communication instructions.

11. A non-transitory computer readable medium having instructions stored thereon that, when executed by a computing device cause the computing device to perform sandbox technology based webpage browsing operations, the operations comprising:
    receiving an instruction for webpage browsing in a sandbox;
    upon receiving the instruction, starting a framework process outside the sandbox to process an operation incurred in the framework process outside the sandbox, wherein the framework process is a first part implemented by a browser;
    intercepting a browser process created by the framework process, wherein the browser process is a second part implemented by the browser; and
    putting the browser process into the sandbox to save a webpage access result in a specified directory in the sandbox, or to run a script in the webpage in a virtual environment of the sandbox.

12. The non-transitory computer readable medium as claimed in claim 11, wherein the operation incurred in the framework process comprises a user input operation.

13. The non-transitory computer readable medium as claimed in claim 11, wherein the operations further comprise:
    adding an identification to the browser process when the framework process creates the browser process, and
    wherein putting the browser process into the sandbox further comprises putting the browser process into the sandbox according to the identification.

14. The non-transitory computer readable medium as claimed in claim 13, wherein the identification includes a sandboxie command line parameter.

15. The non-transitory computer readable medium as claimed in claim 11, wherein the operations further comprise:
   when the browser process in the sandbox needs to send out an instruction from the sandbox, determining whether the instruction is sent out to the framework process and belongs to a preset set of communication instructions; and
   releasing the instruction when the instruction is sent out to the framework process and belongs to the preset set of communication instructions.

* * * * *